United States Patent [19]
Toshinari et al.

[11] Patent Number: 6,044,003
[45] Date of Patent: Mar. 28, 2000

[54] PIEZOELECTRIC TRANSFORMER-INVERTER

[75] Inventors: Kyoji Toshinari, Kyoto; Yasuyuki Morishima, Kyotanabe, both of Japan

[73] Assignee: Murata Manufacturing Co., Ltd., Japan

[21] Appl. No.: 09/296,230

[22] Filed: Apr. 22, 1999

[30] Foreign Application Priority Data

Apr. 27, 1998 [JP] Japan .................................. 10-134370

[51] Int. Cl.[7] .......................... H02M 3/335; H01L 41/08
[52] U.S. Cl. ............................ 363/97; 363/131; 310/318
[58] Field of Search ................................. 363/16, 40, 95, 363/97, 131, 132, 133, 134; 310/316, 318, 319; 323/355

[56] References Cited

U.S. PATENT DOCUMENTS

| | | | |
|---|---|---|---|
| 5,705,877 | 1/1998 | Shimada | 310/318 |
| 5,859,489 | 1/1999 | Shimada | 310/318 |
| 5,866,969 | 2/1999 | Shimada et al. | 310/318 |
| 5,886,514 | 3/1999 | Iguchi et al. | 323/299 |
| 5,923,542 | 7/1999 | Sasaki et al. | 363/16 |
| 5,923,546 | 7/1999 | Shimada | 363/40 |
| 5,942,835 | 8/1999 | Furuhashi et al. | 310/316.01 |
| 5,969,963 | 10/1999 | Ohnishi et al. | 363/132 |

*Primary Examiner*—Adolf Deneke Berhane
*Attorney, Agent, or Firm*—Ostrolenk, Faber Gerb & Soffen, LLP

[57] ABSTRACT

A piezoelectric transformer-inverter in which a fluorescent light tube is light-modulated when a frequency controller changes the frequency of a drive voltage applied from a piezoelectric transformer drive circuit to a piezoelectric transformer in correspondence with a light-modulating voltage to thereby change the boost ratio of the piezoelectric transformer. A PWM inverter output variable circuit adjusts an average voltage supplied from a PWM inverter to a piezoelectric transformer drive circuit. When tube current is low, the average voltage is low, and when the tube current is high, the average voltage rises. Consequently, fluctuation in the drive frequency of the piezoelectric transformer is restricted even when the light-modulating voltage changes, making it possible to drive the piezoelectric transformer with a good boost ratio. Since the piezoelectric transformer is always driven close to its resonant frequency, there is almost no surge charge flowing to the transistor for driving the piezoelectric transformer.

16 Claims, 6 Drawing Sheets

PIEZOELECTRIC TRANSFORMER-INVERTER

BACKGROUND OF THE INVENTION

1. Field of the Invention

The present invention relates to a piezoelectric transformer-inverter for converting dc current to ac current using a piezoelectric transformer.

2. Description of the Related Art

In recent years, a liquid crystal display provided with a backlight has generally been used as a display device in portable data processing equipment, such as a portable video camera and a laptop computer. A fluorescent light tube such as a cold-cathode tube is used as a light source for the backlight. A high-voltage ac current must be applied in order to ignite the fluorescent light tube, and a combination of a battery and an ac adapter is generally used as an input power source for the portable data processing equipment such as a laptop computer. For this reason, a fluorescent light tube igniting device such as a dc/ac inverter is required in order to convert low-voltage dc current, supplied from the input power source, to high-voltage ac current which can be used to ignite the fluorescent light tube. Recently, there has been progress in the development of a piezoelectric transformer-inverter using a piezoelectric transformer, which is comparatively smaller than an electromagnetic transformer, as this kind of fluorescent light tube igniting device.

When attempting to adjust the brightness of the backlight in such a piezoelectric transformer-inverter, it is necessary to control the voltage and current output to the fluorescent light tube to desired values. In a conventional piezoelectric transformer-inverter, methods of stabilizing the voltage and current output to the fluorescent light tube include such methods as: (1) changing the output voltage to the fluorescent light tube by changing the drive frequency of the piezoelectric transformer, using the drive frequency dependency of the boost ratio of the piezoelectric transformer; and (2) using a dc-dc converter and a PWM (pulse-width modulation) inverter circuit to convert the input power voltage from a desired voltage value to an average voltage value, and applying this via a piezoelectric transformer drive circuit to the primary electrodes of the piezoelectric transformer, thereby changing the (average) output voltage to the fluorescent light tube.

Figure 1:
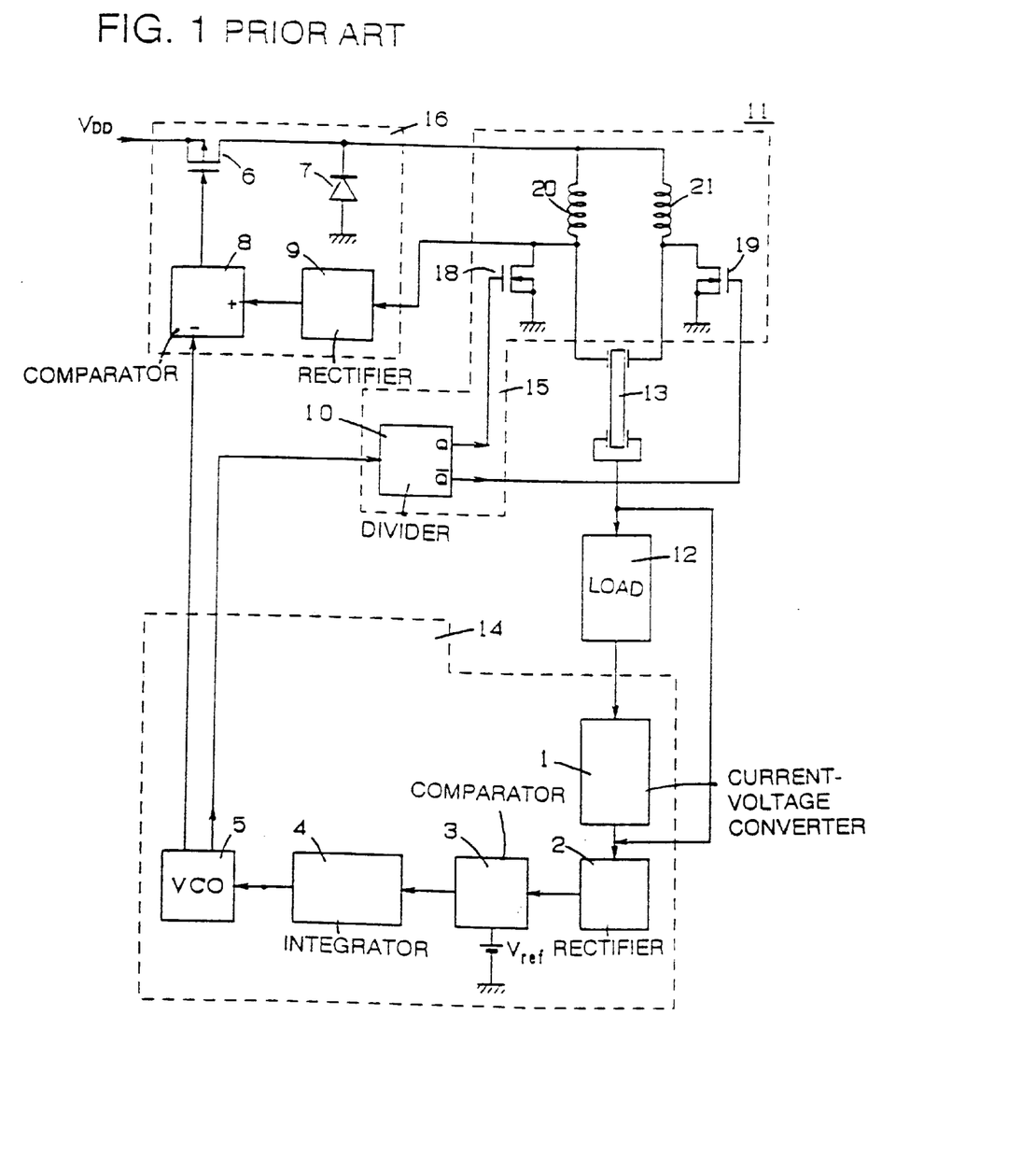
FIG. 1 is a circuit diagram showing a piezoelectric transformer-inverter according to a conventional example.

FIG. 1 shows an example of a piezoelectric transformer-inverter 11 using these methods. The constitution of this piezoelectric transformer-inverter 11 will be explained based on the circuit of FIG. 1. The piezoelectric transformer-inverter 11 comprises a piezoelectric transformer 13 for applying a voltage to a fluorescent light tube 12, a frequency controller 14 for controlling the drive frequency of the piezoelectric transformer 13 and keeping the current flowing to the fluorescent light tube 12 at a predetermined value, a booster (piezoelectric transformer drive circuit) 15 for dividing the frequency of the signal output from the frequency controller 14, and applying a drive voltage of the divided signal to the primary electrodes of the piezoelectric transformer 13, and a drive voltage controller 16 for performing PWM control to ensure that the drive voltage applied to the piezoelectric transformer 13 has a predetermined average value.

The frequency controller 14 comprises a current voltage converter 1, a rectifier 2, a comparator 3, an integrator 4 and a VCO (voltage-controlled oscillator) 5. In this frequency controller 14, the current voltage converter 1 converts the current flowing through the fluorescent light tube 12 to a voltage signal, the rectifier 2 converts this voltage signal to a dc detector voltage; then, the comparator 3 compares this with a reference voltage Vref, and when the detector signal voltage is lower than the reference voltage Vref, the comparator 3 outputs a high-level signal to the integrator 4. While receiving the high-level signal, the integrator 4 lowers its output voltage by a fixed ratio. The VCO 5 outputs a square pulse of a frequency proportional to the control voltage which is input from the integrator 4, and the piezoelectric transformer 13 is driven via the booster 15 at the frequency of the VCO 5.

The booster 15 has a push-pull operation using two transistors 18 and 19 and two coils 20 and 21. The VCO 5 outputs a square pulse of a frequency which is twice the drive frequency of the piezoelectric transformer 13, the booster 15 uses a divider 10 to divide the frequency of the signal output from the VCO 5 of the frequency controller 14 to a half frequency, and the transistors 18 and 19 are alternately switched ON and OFF in accordance with the signal output from the divider 10. When the transistors 18 and 19 switch ON, current flows from the input power source (not shown) to the coils 20 and 21, charging them with electromagnetic energy, and when the transistors 18 and 19 turn OFF, the electromagnetic energy charged in the coils is released, and a sine wave voltage higher than the input power voltage $V_{DD}$ is applied to the primary electrodes of the piezoelectric transformer 13.

Since the piezoelectric transformer 13 is driven in a higher region than the resonant frequency, when the current flowing to the fluorescent light tube 12 drops, the frequency of the VCO 5 also drops, increasing the boost ratio of the piezoelectric transformer 13; conversely, when the current flowing to the fluorescent light tube 12 increases, the frequency of the VCO 5 rises, decreasing the boost ratio of the piezoelectric transformer 13, and as a result, the boost ratio of the piezoelectric transformer 13 is controlled so that a stable current flows to the fluorescent light tube 12.

The drive voltage controller 16 comprises a switching transistor 6, a flywheel diode 7, a comparator 8 and a rectifier 9. The VCO 5 of the frequency controller 14 outputs a triangular wave signal at a frequency which is twice the drive frequency of the piezoelectric transformer 13 to the comparator 8. The rectifier 9 smoothes the drain voltage of the transistor 18 of the booster 15 and inputs the smoothed drain voltage to the comparator 8. The comparator 8 compares the triangular wave signal voltage from the VCO 5 with the rectifier output and controls the switching transistor 6 to adjust the duty ratio of the voltage $V_{DD}$ supplied from the input power source (not shown) to the booster 15, and keeps the drive voltage of the piezoelectric transformer 13 fixed. Consequently, the drive voltage controller 16 controls the drive voltage applied to the piezoelectric transformer 13 so that it is stabilized at a predetermined average voltage, even when the input power voltage $V_{DD}$ changes.

However, among light-adjusting systems for controlling output voltage and output current to a fluorescent light tube, a method which uses the drive frequency dependency of the boost ratio of the piezoelectric transformer has a disadvantage that, when the input power voltage has risen, the drive frequency of the piezoelectric transformer must be increased and the piezoelectric transformer must be operated with a small boost ratio, causing the efficiency of the piezoelectric transformer to deteriorate.

To solve this problem, as shown in FIG. 1, with the piezoelectric transformer-inverter 11 in the system for PWM controlling the input power voltage $V_{DD}$, the drive voltage is kept at a predetermined average value by controlling the duty ratio using the drive voltage controller 16, and therefore, even when the input power voltage $V_{DD}$ has a wide range (particularly, when the input power voltage is high), the piezoelectric transformer 13 can be operated close to the resonant frequency and the efficiency of the piezoelectric transformer 13 does not substantially deteriorate.

According to this piezoelectric transformer-inverter 11, the drive voltage controller 16 controls the drive voltage to a predetermined average value, and the frequency controller 14 modulates the light by changing the piezoelectric transformer drive frequency. When lowering the tube current, the frequency controller 14 controls the drive current so that the boost ratio of the piezoelectric transformer 13 decreases, lowering the tube current, whereby the frequency controller 14 outputs a higher drive frequency and the piezoelectric transformer 13 operates at a frequency of poor efficiency far from the resonant frequency. As a consequence, the piezoelectric transformer-inverter 11 has the disadvantage that, when a small current flows to the fluorescent light tube 12, the piezoelectric transformer 13 operates at a frequency of poor efficiency, lowering the overall efficiency of the piezoelectric transformer-inverter.

SUMMARY OF THE INVENTION

The present invention has been realized in consideration of the defects of the conventional technology described above, and aims to provide a piezoelectric transformer-inverter capable of efficiently driving a piezoelectric transformer and obtaining a desired output current with high efficiency, even when input power voltage has fluctuated and when load current has fluctuated.

The piezoelectric transformer-inverter of the present invention comprises a piezoelectric transformer having primary electrodes and a secondary electrode; drive voltage control means (circuit) for switching ON and OFF a dc voltage for generating a drive voltage having an average voltage value; piezoelectric transformer drive means (circuit) for converting the drive voltage to an ac voltage and supplying the ac voltage to the primary electrodes of the piezoelectric transformer, the piezoelectric transformer converting the ac voltage at the primary electrodes thereof to a load current at the secondary electrode thereof and supplying the load current to a load connected to the secondary electrode; oscillation means (oscillator) for providing an oscillating signal to the piezoelectric transformer drive means (circuit); drive voltage variable means (circuit) for controlling the average voltage value of the drive voltage supplied from the drive voltage control means to the piezoelectric transformer drive means (circuit) in correspondence with a modulating voltage; and frequency modulating means (controller) for changing the frequency of the oscillating signal supplied by the oscillating means (oscillator) in correspondence with the modulating voltage to change a boost ratio of the piezoelectric transformer such that the piezoelectric transformer is driven near its resonant frequency. Particularly, when the modulating voltage has been changed to reduce the load current, the frequency modulating means (controller) moves the drive frequency of the piezoelectric transformer nearer to the resonant frequency of the piezoelectric transformer. Alternatively, the drive voltage variable means (circuit) may change the average voltage, supplied from the drive voltage control means to the piezoelectric transformer drive means (circuit), in correspondence with the modulating voltage.

According to this piezoelectric transformer-inverter, since the frequency modulating means (controller) compares the dc current flowing to the load with the modulating voltage and controls the oscillating frequency of the oscillation means (oscillator) accordingly, when the modulating voltage has changed to reduce the load current, the drive frequency of the piezoelectric transformer can be moved nearer to the resonant frequency of the piezoelectric transformer. Therefore, when the modulating voltage has been adjusted in a direction which reduces the load current, the boost ratio of the piezoelectric transformer decreases and the current flowing to the load decreases, whereby modulation, that is, control of the load current carried out by the piezoelectric transformer, is controlled by controlling the boost ratio of the piezoelectric transformer using the drive frequency, and controlling the drive voltage using the drive voltage variable means (circuit). As a result, even when the modulating voltage has been adjusted in a direction which reduces the load current, the drive voltage variable means (controller) is able to prevent the drive frequency of the piezoelectric transformer from moving away from the resonant frequency, and in addition, the frequency modulating means (controller) is able to move the drive frequency of the piezoelectric transformer closer to the resonant frequency, thereby making it possible to reduce the degree of change of the drive frequency of the piezoelectric transformer when the modulating voltage is adjusted, and enabling the piezoelectric transformer-inverter to be run efficiently.

Other features and advantages of the present invention will become apparent from the following description of the invention which refers to the accompanying drawings.

DESCRIPTION OF THE PREFERRED EMBODIMENTS

Figure 2:
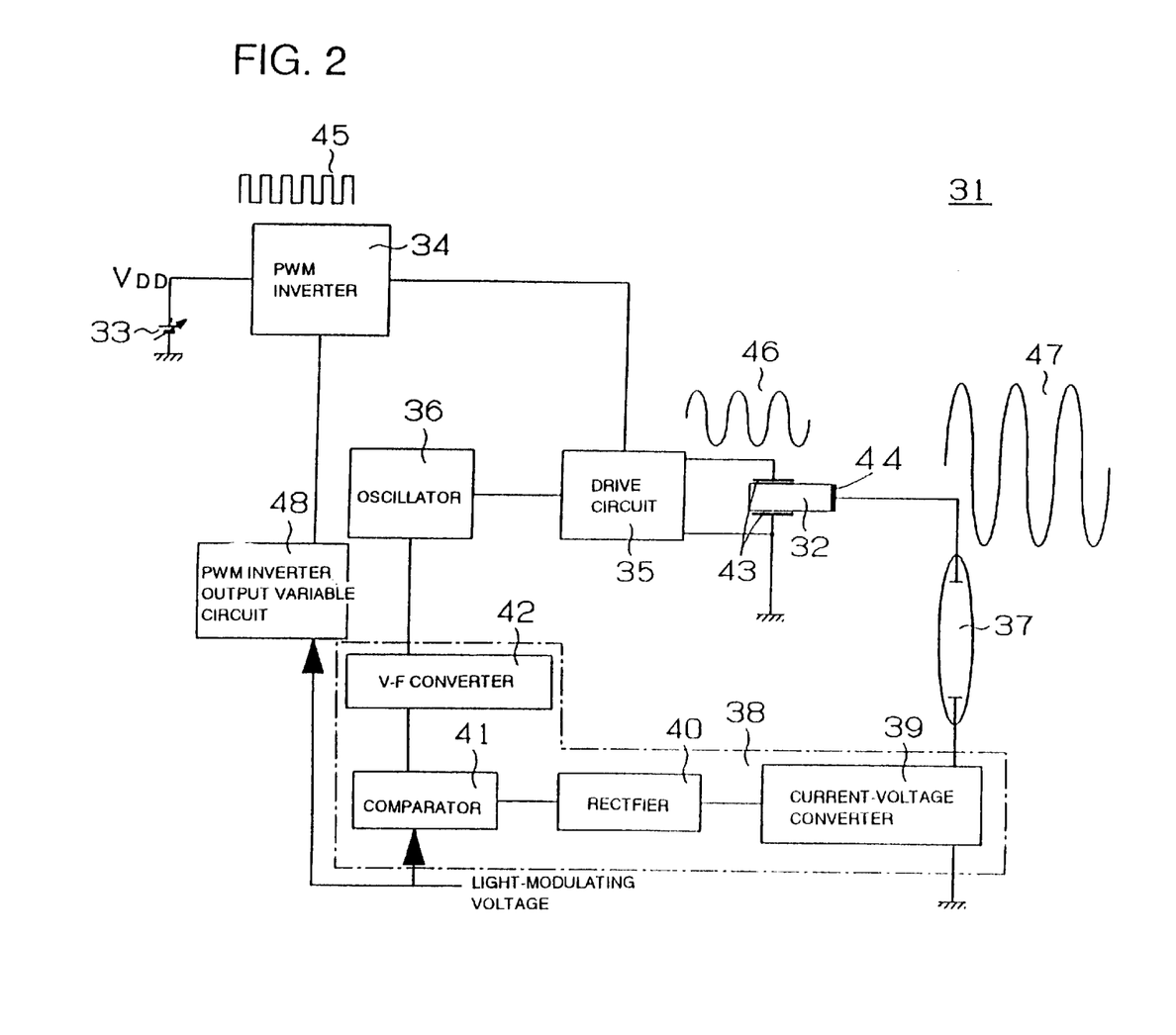
FIG. 2 is a circuit diagram showing a piezoelectric transformer-inverter according to an embodiment of the present invention.

FIG. 2 is a circuit block diagram showing the constitution of a piezoelectric transformer-inverter 31 according to an embodiment of the present invention. This piezoelectric transformer-inverter 31 comprises a piezoelectric transformer 32 for driving a fluorescent light tube 37, a piezoelectric transformer drive circuit (piezoelectric transformer drive means) 35, an oscillator (oscillating means) 36, a frequency controller (frequency control means) 38, a PWM (pulse-width modulating) inverter 34 and a PWM inverter output variable circuit (drive voltage varying means) 48.

The PWM inverter 34 PWM controls the direct current input power voltage $V_{DD}$ supplied from an input power source 33 and outputs to the piezoelectric transformer drive circuit 35, and even when the input power voltage $V_{DD}$ fluctuates, the PWM inverter 34 is able to supply a fixed average output voltage to the piezoelectric transformer drive circuit 35 by self-adjusting the duty ratio of its PWM control. That is, the input power source 33 generates dc voltage, and the PWM inverter 34 generates a square pulse signal 45 at a higher frequency (for instance, 240 kHz) than the drive frequency (for instance, 60 kHz), changing the duty ratio so as to achieve a stable average output voltage of a desired value. Here, the duty ratio η of the PWM inverter 34 is expressed as η=Ton/(Ton+Toff)

where Ton: the ON time of the PWM inverter 34, and
Toff: the OFF time of the PWM inverter 34
and if the input power voltage is expressed as $V_{DD}$, the average output voltage of the PWM inverter is $V_D$, then
$V_D = \eta V_{DD}$.

The piezoelectric transformer drive circuit 35 converts the square pulse signal 45 supplied from the PWM inverter 34 to an ac voltage signal 46 at a drive frequency equal to the oscillation frequency input from the oscillator 36, and applies this between the primary electrodes of the piezoelectric transformer 32. The piezoelectric transformer 32 boosts the drive voltage input to the primary electrodes 43 by a boost ratio corresponding to the drive frequency, and a secondary electrode 44 applies the boosted ac voltage signal 47 to a fluorescent light tube 37.

The frequency controller 38 comprises a current-voltage converter 39, a rectifier 40, a comparator 41 and a V-F (voltage/frequency) converter 42. In this frequency controller 38, the current-voltage converter 39 converts the current flowing to the fluorescent light tube 37 to a voltage signal proportional to the tube current, the rectifier 40 converts it to a dc detector voltage, and the comparator 41 compares the detector signal voltage with a light-modulating voltage. The comparator 41 compares the detector signal voltage with the light-modulating voltage, amplifies the differential voltage between them, and outputs to the V-F converter 42. The V-F converter 42 sends a square pulse signal at a frequency in correspondence with the output from the comparator 41, namely the differential voltage between the detector signal voltage with the light-modulating voltage, to the oscillator 36. The oscillator 36 outputs a signal at a frequency which is equal to the frequency input from the V-F converter 42 to the piezoelectric transformer drive circuit 35.

Figure 3:
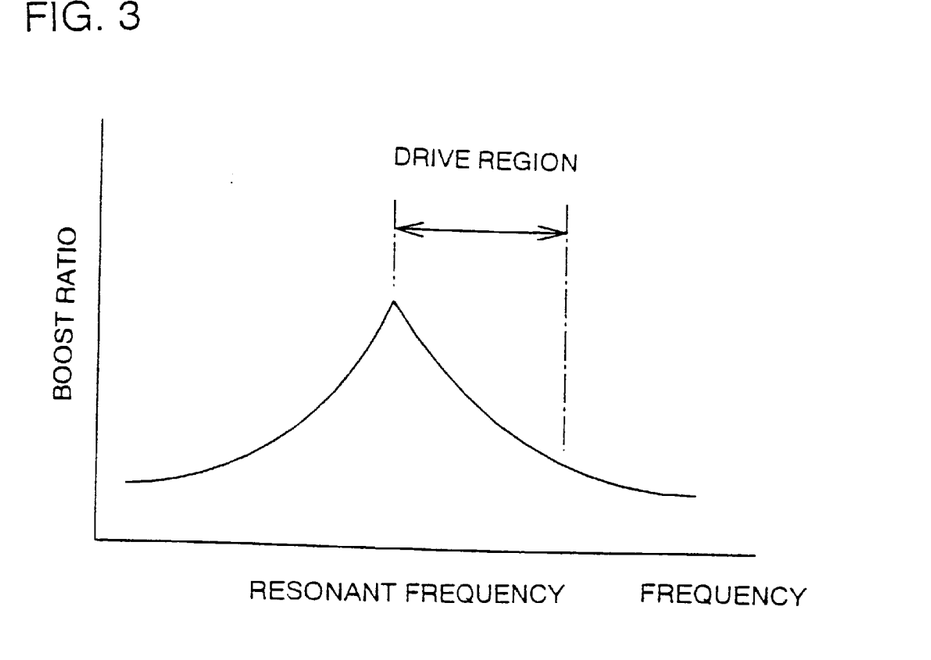
FIG. 3 is a diagram showing the relation between boost ratio and drive frequency of a piezoelectric transformer.

However, considering a case where, as shown in FIG. 3, the piezoelectric transformer 32 is being driven in a frequency region higher than its resonant frequency, when the tube current flowing to the fluorescent light tube 37 has increased, the action of the frequency controller 38 causes the drive frequency of the piezoelectric transformer 32 to shift to the high-frequency side, lowering the boost ratio of the piezoelectric transformer 32, whereby the current flowing to the fluorescent light tube 37 decreases. When the current flowing to the fluorescent light tube 37 has decreased, the drive frequency of the piezoelectric transformer 32 shifts to the low-frequency side, raising the boost ratio of the piezoelectric transformer 32, whereby the current flowing to the fluorescent light tube 37 increases. Therefore, when the current flowing to the fluorescent light tube 37 has fluctuated, the frequency controller 38 adjusts the boost ratio of the piezoelectric transformer 32, stabilizing the current flow to the fluorescent light tube 37.

Furthermore, when a high light-modulating voltage is input, the voltage differential between the detector signal voltage and the light-modulating voltage decreases, and the frequency controller 38 shifts the drive frequency of the piezoelectric transformer 32 to the low-frequency side, raising the boost ratio of the piezoelectric transformer 32, whereby the current flow to the fluorescent light tube 37 increases. When a small light-modulating voltage is input, the drive frequency of the piezoelectric transformer 32 shifts to the high-frequency side, lowering the boost ratio of the piezoelectric transformer 32, whereby the current flowing to the fluorescent light tube 37 decreases. Therefore, a frequency drive circuit changes the boost ratio of the piezoelectric transformer 32 in correspondence with the size of the light-modulating voltage, increasing or decreasing the current flowing to the fluorescent light tube 37, and thereby modulates the light of the fluorescent light tube 37.

The PWM inverter output variable circuit 48 also controls the current flowing to the fluorescent light tube 37 in correspondence with the light-modulating voltage, and when the light-modulating voltage is increased in order to raise the brightness of the fluorescent light tube 37, the PWM inverter output variable circuit 48 increases the average voltage value supplied from the PWM inverter 34 to the piezoelectric transformer drive circuit 35, and when the light-modulating voltage is lowered in order to lower the brightness of the fluorescent light tube 37, the PWM inverter output variable circuit 48 decreases the average voltage value supplied from the PWM inverter 34 to the piezoelectric transformer drive circuit 35. The average voltage value supplied to the piezoelectric transformer drive circuit 35 can be changed by changing the voltage (H-level voltage value) supplied from the PWM inverter 34 to the piezoelectric transformer drive circuit 35, or by changing the duty ratio.

Figure 4:
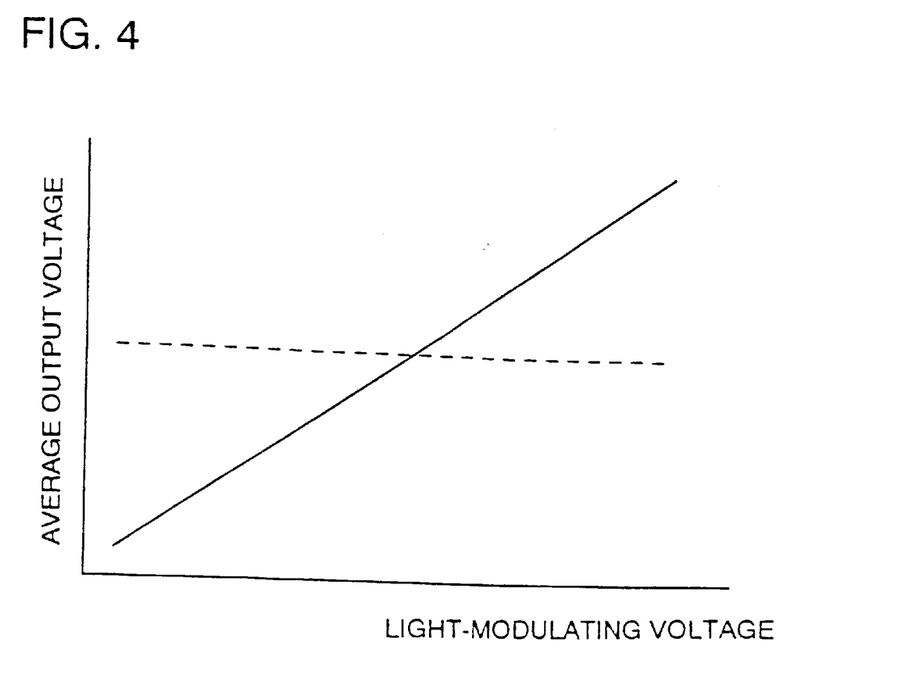
FIG. 4 is a diagram showing the relation between light-modulating voltage input to a PWM inverter input-variable circuit and average output voltage output from a PWM inverter circuit.

However, in this piezoelectric transformer-inverter 31, the light-modulating voltage is input instead of a reference voltage to the PWM inverter output variable circuit 48, and when the light-modulating voltage has been adjusted, the current flowing to the fluorescent light tube 37 is also controlled by the PWM inverter 34. In FIG. 4, the broken line shows the relation between light-modulating voltage and drive voltage when the reference voltage (light-modulating voltage) input to the PWM inverter output variable circuit 48 is maintained at a fixed value, as in the conventional piezoelectric transformer-inverter, whereas the solid line shows the increasing change in the drive voltage when the light-modulating voltage is input to the PWM inverter output variable circuit 48 and made variable, as in the present invention. As a consequence, when the light-modulating voltage is lowered, the fluorescent light tube 37 is light-modulated by the PWM inverter output variable circuit 48 and the frequency controller 38, but since the PWM inverter output variable circuit 48 lowers the drive voltage (FIG. 4), the action of the PWM inverter output variable circuit 48 lowers the tube current, and as a result, the degree by which the drive frequency of the piezoelectric transformer 32 shifts to the high-frequency side is reduced. Therefore, by selecting an appropriate relation between the light-modulating voltage and the drive voltage as shown in FIG. 4, it is possible to prevent changes in the drive frequency of the piezoelectric transformer 32 almost completely, even when the light-modulating voltage changes, enabling the piezoelectric transformer 32 to be always driven at a frequency of good efficiency (a frequency near the resonant frequency).

Figure 5:
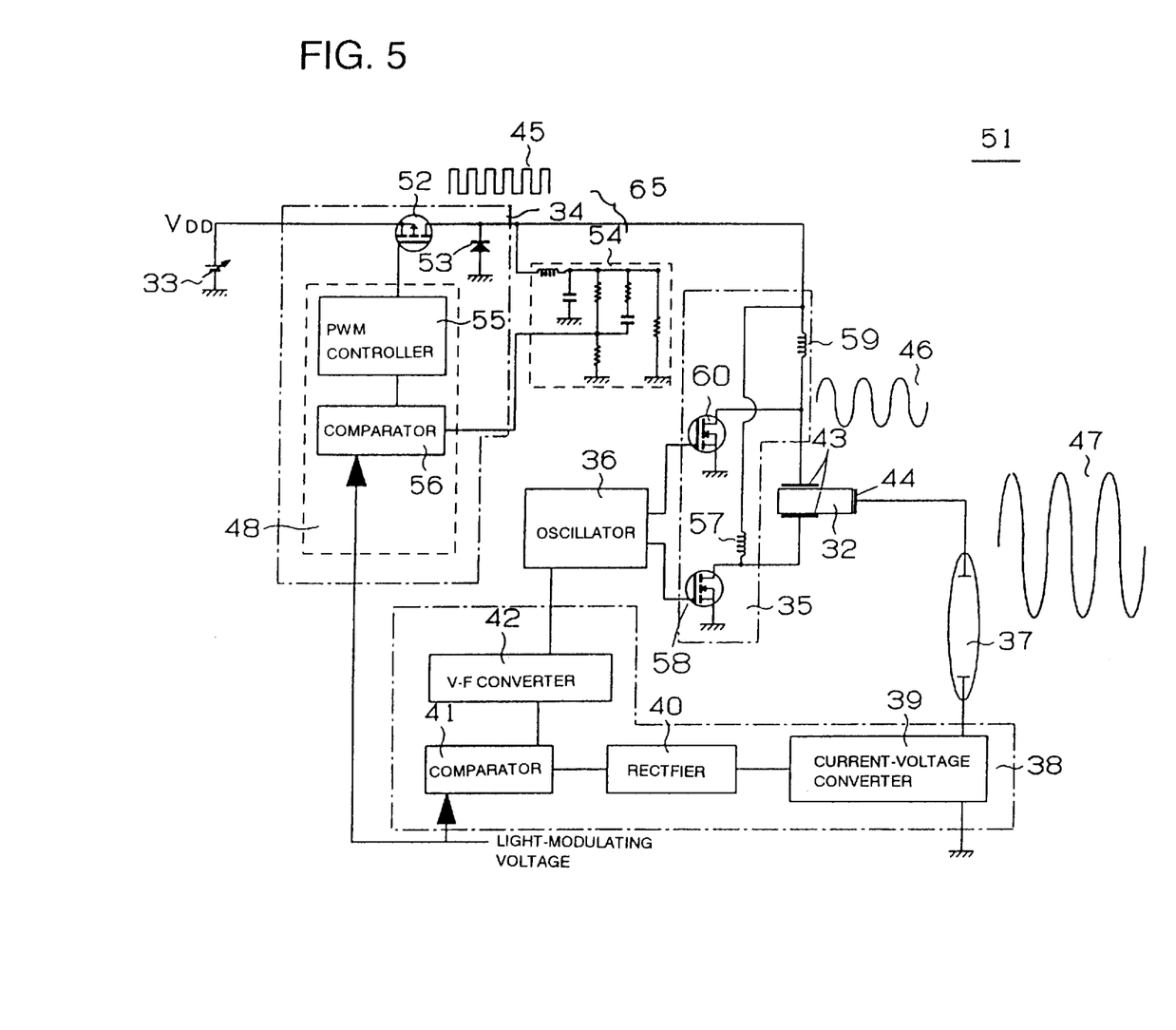
FIG. 5 is a circuit diagram showing a detailed constitution of the above piezoelectric transformer-inverter.

FIG. 5 is a circuit diagram showing a constitution of a piezoelectric transformer-inverter 51 comprising a more specific arrangement of the piezoelectric transformer-inverter 31. This piezoelectric transformer-inverter 51 uses a two-wave drive piezoelectric transformer drive circuit 35.

That is, the piezoelectric transformer drive circuit 35 has a push-pull operation using two transistors 58 and 60 and two coils 57 and 59. When the oscillator 36 outputs a pulse signal at the oscillating frequency, the two transistors 58 and 60 switch ON and OFF alternately, whereby a sine wave voltage is applied to the primary electrodes 43 of the piezoelectric transformer 32.

Furthermore, the PWM inverter 34 comprises a transistor 52 inserted between the input power source 33 and the piezoelectric transformer drive circuit 35, a flywheel diode 53 connected midway between the transistor 52 and the piezoelectric transformer drive circuit 35, a PWM controller 55 and a comparator 56. An output of the PWM inverter 34 is connected to a smoothing circuit 54, and the PWM inverter 34 and the smoothing circuit 54 constitute a dc-dc converter 65. A divided voltage of a DC output voltage generated by the smoothing circuit 54 and the light-modulating voltage is input to the comparator 56, the comparator 56 outputs to the PWM controller 55, and the PWM controller 55 switches the transistor 52 ON and OFF. The PWM inverter output variable circuit 48 comprises the comparator 56 and the PWM controller 55.

An average output voltage sent from the PWM inverter 34 to the piezoelectric transformer drive circuit 35 is converted by the smoothing circuit 54 to a dc voltage which is proportional to the average output voltage, and input to the comparator 56. The comparator 56 compares a light-modulating voltage dependent on a desired tube current with the dc voltage (a voltage dependent on the tube current) sent from the smoothing circuit 54, and when the average output voltage from the PWM inverter 34 increases (or decreases), the PWM controller 55 lowers (or raises) the duty ratio which turns the transistor 52 ON and OFF, and the piezoelectric transformer-inverter 51 functions overall as a feedback loop, achieving a desired tube current.

Furthermore, since the reference voltage applied to the comparator 56 changes when the light-modulating voltage changes, the dc-dc converter 65 controls the average output voltage of the PWM inverter 34.

Then, in this piezoelectric transformer-inverter 51, as explained in the first embodiment, even when the input power voltage $V_{DD}$ fluctuates, or when the current flowing to the fluorescent light tube 37 changes following adjustment of the light-modulating voltage, the piezoelectric transformer 32 can be driven at a good drive frequency close to the resonant frequency, and the piezoelectric transformer-inverter 51 can be driven with good efficiency.

Furthermore, according to the piezoelectric transformer-inverter 51 of the present invention, since there is no need to provide a divider to the piezoelectric transformer drive circuit as in the conventional piezoelectric transformer-inverter, the circuit constitution is simple.

Furthermore, according to the piezoelectric transformer-inverter 51 of the present invention, since the piezoelectric transformer 32 is always driven at a frequency near its resonant frequency, there is almost no surge current flowing to the transistor for driving the piezoelectric transformer, and consequently power loss is reduced. Similarly, since the piezoelectric transformer is always driven at a frequency near the resonant frequency, the problem of intermittent ignition, which sometimes occurs at frequencies higher than the resonant frequency, is unlikely to arise.

Figure 6:
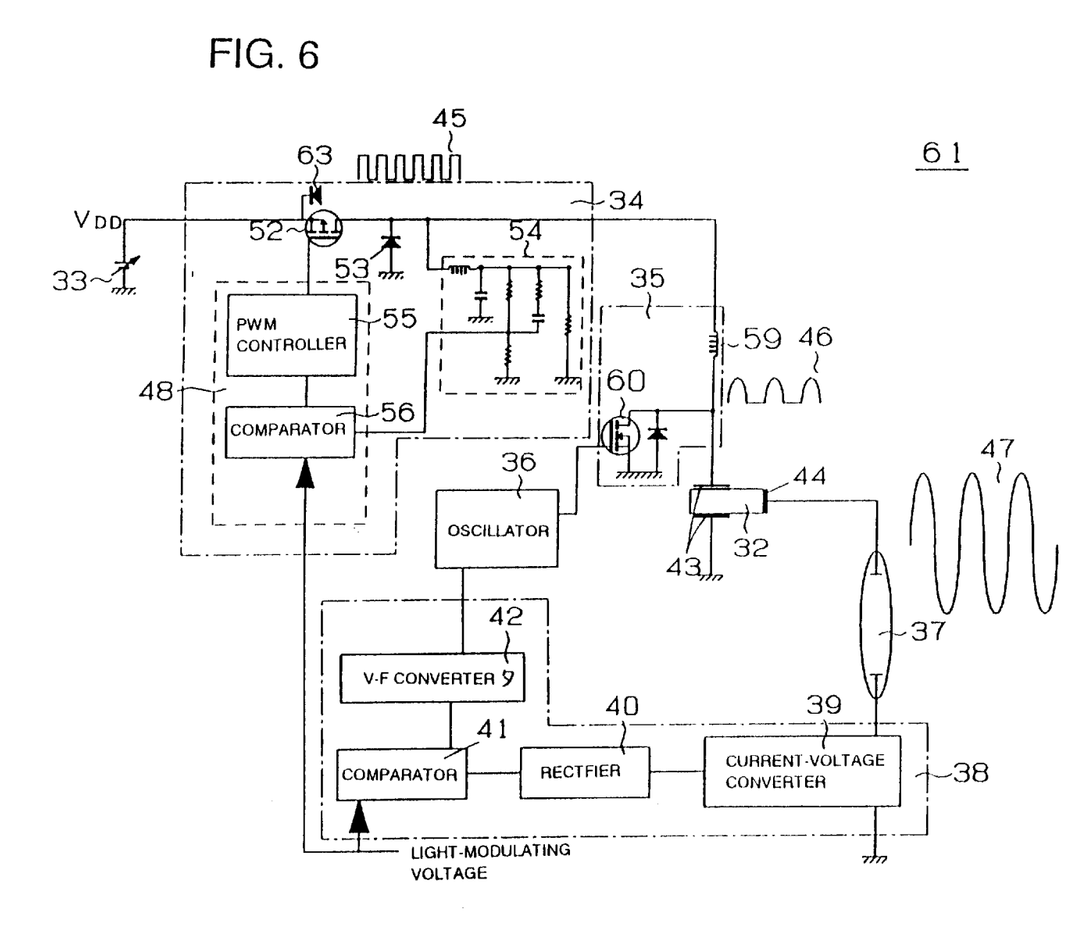
FIG. 6 is a circuit diagram showing another detailed constitution of the piezoelectric transformer-inverter of FIG. 2.

Furthermore, as shown by the piezoelectric transformer-inverter 61 in FIG. 6, in the piezoelectric transformer-inverter of the present invention, the piezoelectric transformer drive circuit 35 may comprise a single-wave drive push-pull drive circuit, comprising one transistor 60 and one coil 59.

Figure 7:
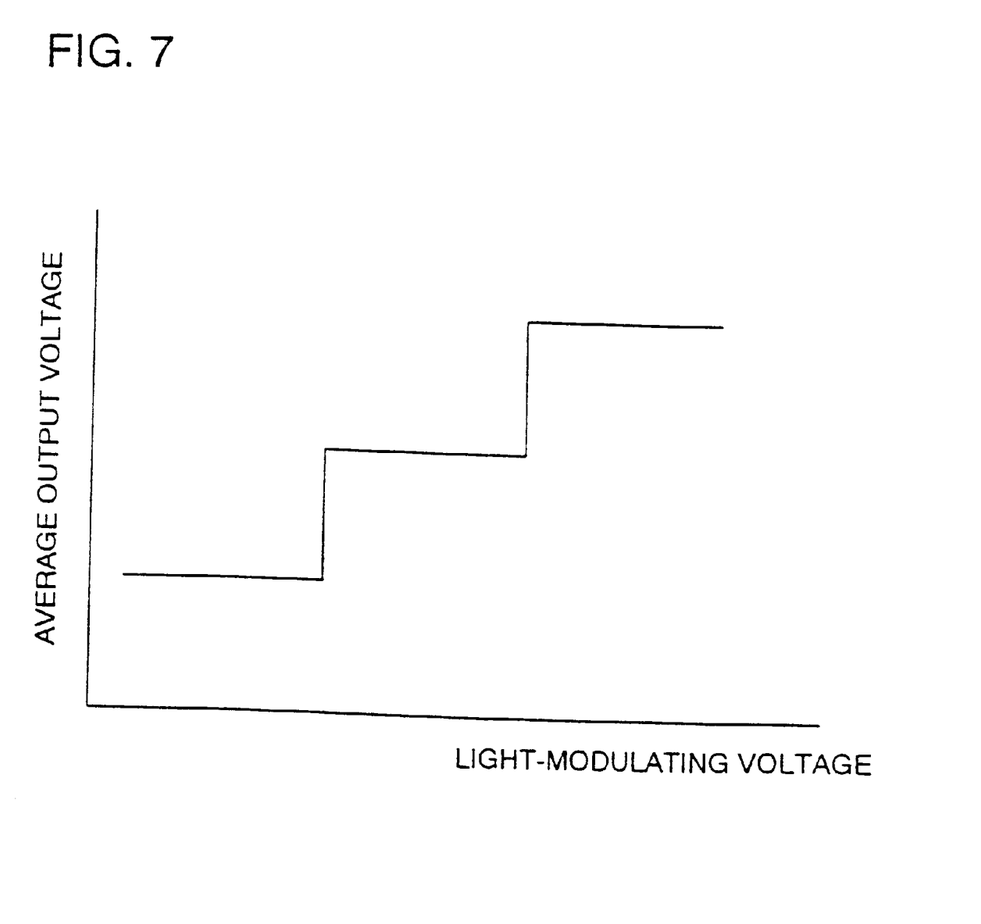
FIG. 7 is a diagram showing another relation between light-modulating voltage input to a PWM inverter input-variable circuit and average output voltage output from a PWM inverter circuit.

In each of the embodiments described above, the average output voltage supplied from the PWM inverter 34 was linear with respect to the light-modulating voltage, but, as shown in FIG. 7, the average output voltage may alternatively change in two, three or more stages.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A piezoelectric transformer-inverter, comprising:

a piezoelectric transformer having primary electrodes and a secondary electrode;

drive voltage control means for switching ON and OFF a dc voltage for generating a drive voltage having an average voltage value;

piezoelectric transformer drive means for converting said drive voltage to an ac voltage and supplying said ac voltage to said primary electrodes of said piezoelectric transformer, said piezoelectric transformer converting said ac voltage at said primary electrodes thereof to a load current at said secondary electrode thereof and supplying said load current to a load connected to said secondary electrode;

oscillation means for providing an oscillating signal to said piezoelectric transformer drive means;

drive voltage variable means for controlling said average voltage value of said drive voltage supplied from said drive voltage control means to said piezoelectric transformer drive means in correspondence with a modulating voltage; and frequency modulating means for changing the frequency of said oscillating signal supplied by said oscillating means in correspondence with said modulating voltage to change a boost ratio of said piezoelectric transformer such that said piezoelectric transformer is driven near its resonant frequency.

2. A piezoelectric transformer-inverter according to claim 1, wherein, if said modulating voltage is changed to reduce said load current, said frequency modulating means changes the frequency of said oscillation signal in a direction toward the resonant frequency of said piezoelectric transformer.

3. A piezoelectric transformer-inverter according to claims 1 or 2, wherein said modulating voltage is changed in stages and said drive voltage variable means changes said average voltage of said drive voltage supplied from said drive voltage control means to said piezoelectric transformer drive means in correspondence with said changes in stages of said modulating voltage.

4. A piezoelectric transformer-inverter according to claim 1, wherein said drive voltage control means includes a pulse-width modulating inverter.

5. A piezoelectric transformer-inverter according to claim 1, wherein said frequency modulating means includes a current-voltage converter for converting said load current through said load to an output voltage, a rectifier for rectifying said output voltage of said current-voltage converter, a comparator for comparing the rectified output voltage to said modulating voltage, and a voltage/frequency converter for converting the results of the comparison to a signal having a frequency based upon the output of said comparator.

6. A piezoelectric transformer-inverter according to claim 1, wherein said piezoelectric transformer drive means includes a push-pull circuit having two transistors and two coils, each of said coils being switched on and off alternately by a respective one of said two transistors.

7. A piezoelectric transformer-inverter according to claim 1, wherein said drive voltage control means includes a transistor for switching on and off said dc voltage to generate said drive voltage, a smoothing circuit for receiving said drive voltage and converting it to a dc voltage which is proportional to said drive voltage, and a comparator for comparing the output from the smoothing circuit to the modulating voltage and for controlling the duty cycle of said transistor in accordance with said comparison.

8. A piezoelectric transformer-inverter according to claim 1, wherein said piezoelectric transformer drive means includes a push-pull circuit comprising one transistor and one coil.

9. A piezoelectric transformer-inverter according to claim 1, wherein said drive voltage variable means includes a pulse-width modulating circuit.

10. A piezoelectric transformer-inverter, comprising:

a piezoelectric transformer having primary electrodes and a secondary electrode;

a drive voltage control circuit for switching ON and OFF a dc voltage for generating a drive voltage having an average voltage value;

a piezoelectric transformer drive circuit for converting said drive voltage to an ac voltage and supplying said ac voltage to said primary electrodes of said piezoelectric transformer, said piezoelectric transformer converting said ac voltage at said primary electrodes thereof to a load current at said secondary electrode thereof and supplying said load current to a load connected to said secondary electrode;

an oscillator for providing an oscillating signal to said piezoelectric transformer drive circuit;

a drive voltage variable circuit for controlling said average voltage value of said drive voltage supplied from said drive voltage control circuit to said piezoelectric transformer drive circuit in correspondence with a modulating voltage; and a frequency controller for changing the frequency of said oscillating signal supplied by said oscillator in correspondence with said modulating voltage to change a boost ratio of said piezoelectric transformer such that said piezoelectric transformer is driven near its resonant frequency.

11. A piezoelectric transformer-inverter according to claim 10, wherein said drive voltage control circuit includes a pulse-width modulating inverter.

12. A piezoelectric transformer-inverter according to claim 11, wherein said frequency controller includes a current-voltage converter for converting said load current through said load to an output voltage, a rectifier for rectifying said output voltage of said current-voltage converter, a comparator for comparing the rectified output voltage to said modulating voltage, and a voltage/frequency converter for converting the results of the comparison to a signal having a frequency based upon the output of said comparator.

13. A piezoelectric transformer-inverter according to claim 12, wherein said piezoelectric transformer drive circuit includes a push-pull circuit having two transistors and two coils, each of said coils being switched on and off alternately by a respective one of said two transistors.

14. A piezoelectric transformer-inverter according to claim 13, wherein said drive voltage control circuit includes a transistor for switching on and off said dc voltage to generate said drive voltage, a smoothing circuit for receiving said drive voltage and converting it to a dc voltage which is proportional to said drive voltage, and a comparator for comparing the output from the smoothing circuit to the modulating voltage and for controlling the duty cycle of said transistor in accordance with said comparison.

15. A piezoelectric transformer-inverter according to claim 14, wherein said piezoelectric transformer drive circuit includes a push-pull circuit comprising one transistor and one coil.

16. A piezoelectric transformer-inverter according to claim 15, wherein said drive voltage variable circuit includes a pulse-width modulating circuit.

* * * * *